US008095158B2

(12) United States Patent
Kim et al.

(10) Patent No.: US 8,095,158 B2
(45) Date of Patent: Jan. 10, 2012

(54) TIME SETTING METHOD AND APPARATUS FOR USE IN A MOBILE COMMUNICATION TERMINAL

(75) Inventors: Soh-Mann Kim, Yongin-si (KR); Ki-Tae Lee, Seoul (KR); Ok-Hyeon Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1278 days.

(21) Appl. No.: 11/803,120

(22) Filed: May 11, 2007

(65) Prior Publication Data

US 2007/0293252 A1 Dec. 20, 2007

(30) Foreign Application Priority Data

May 11, 2006 (KR) ........................ 10-2006-0042642

(51) Int. Cl.
*H04W 4/00* (2009.01)
(52) U.S. Cl. ............... 455/466; 455/566; 455/435.1; 709/204; 709/229; 370/338; 370/466; 370/392
(58) Field of Classification Search ........... 455/466, 455/412.1, 428, 453, 423, 553, 338; 370/328, 370/338, 466
See application file for complete search history.

(56) References Cited

U.S. PATENT DOCUMENTS

| 7,206,590 | B2 * | 4/2007 | Anson et al. ............ 455/466 |
| 2003/0083078 | A1 * | 5/2003 | Allison et al. ............ 455/466 |
| 2004/0023681 | A1 * | 2/2004 | Zschintzsch ............ 455/550.1 |
| 2004/0072595 | A1 * | 4/2004 | Anson et al. ............ 455/566 |
| 2004/0180678 | A1 * | 9/2004 | Smith et al. ............ 455/466 |
| 2004/0199649 | A1 * | 10/2004 | Tarnanen et al. ............ 709/230 |
| 2005/0090272 | A1 * | 4/2005 | Anson et al. ............ 455/466 |

FOREIGN PATENT DOCUMENTS

KR 1020060039823 5/2006

* cited by examiner

*Primary Examiner* — Nick Corsaro
*Assistant Examiner* — Joseph Arevalo
(74) *Attorney, Agent, or Firm* — The Farrell Law Firm, P.C.

(57) ABSTRACT

Disclosed is a time setting method and apparatus for use in a mobile communication terminal. The mobile communicates terminal transmits a short message to a short message service center (SMSC). When receiving a short message service (SMS) status report message indicating if a destination side has received the short message, the mobile communication terminal extracts short message reception time information of the SMSC included in the SMS status report message. The mobile communication terminal sets a time of the mobile communication terminal on a basis of the reception time information.

14 Claims, 5 Drawing Sheets

| YEAR | MONTH | DAY | HOUR | MINUTE | SECOND | TIME ZONE |
|---|---|---|---|---|---|---|
| 2 | 2 | 2 | 2 | 2 | 2 | 2 |

FIG.3

TIME SETTING METHOD AND APPARATUS FOR USE IN A MOBILE COMMUNICATION TERMINAL

PRIORITY

This application claims priority under 35 U.S.C. §119 to an application entitled "Time Setting Method and Apparatus for Use in a Mobile Communication Terminal" filed in the Korean Intellectual Property Office on May 11, 2006 and assigned Serial No. 2006-42642, the contents of which are incorporated herein by reference.

BACKGROUND OF THE INVENTION

1. Field of the Invention

The present invention relates generally to a mobile communication terminal, and more particularly to a time setting method and apparatus for use in a mobile communication terminal.

2. Description of the Related Art

Along with the development of technology, mobile communication terminals provide users with various convenient functions. In particular, as a roaming service for international travelers is commercialized, there is rising importance to set an internal clock or time of a mobile communication terminal according to the local time zone.

A synchronous mobile communication system periodically broadcasts broadcasting information including time information. Thus, the mobile communication terminal sets an internal time using the broadcast information whenever receiving the broadcast information from the mobile communication system. The mobile communication terminal can provide a user with services using the time information according to local time zone, regardless of a time zone change.

However, an asynchronous mobile communication system does not provide periodic time information, which is different from the synchronous mobile communication system. Thus, asynchronous mobile communication terminals cannot provide users with services using time information according to local time zone or exact current time, when battery power for starting a timer is exhausted or they move to a region of a different time zone.

To address this problem, technology has been proposed which can set an internal time of an asynchronous mobile communication terminal using a conventional short message service (SMS).

The proposed technology is disclosed in U.S. Patent Publication No. 2004/0023681 entitled "METHOD FOR SYNCHRONIZING THE INTERNAL CLOCK OF A MOBILE RADIO TERMINAL WITH LOCAL TIME". In U.S. Patent Publication No. 2004/0023681, when a mobile radio terminal transmits a short message to itself, a short message service center (SMSC) receives the short message, incorporates a time stamp into the short message, and transmits the short message containing the time stamp to the terminal. When receiving the short message, the terminal sets an internal time by comparing the time stamp contained in the short message with time information counted thereby.

In the conventional technology, the users are inconvenienced because they must transmit a short message whenever a time setting process is needed. Further, there is a problem in that unnecessary fees can be charged because the mobile communication terminal must transmit the short message.

Thus, technical development is required to automatically perform a time setting process without interaction by a user and to avoid unnecessary fees when a time setting process is needed in a mobile communication terminal of an asynchronous mobile communication system.

SUMMARY OF THE INVENTION

Therefore, the present invention provides a time setting method and apparatus that can automatically perform a time setting process according to current time in a mobile communication terminal of an asynchronous mobile communication system.

In accordance with an aspect of the present invention, there is provided a time setting method for use in a mobile communication terminal, that includes transmitting a short message to a short message service center (SMSC); extracting short message reception time information of the SMSC included in a short message service (SMS) status report message when receiving the SMS status report message indicating if a destination side has received the short message; and setting a time of the mobile communication terminal on a basis of the reception time information.

In accordance with another aspect of the present invention, there is provided a time setting method for use in a mobile communication terminal of a mobile communication system, that includes transmitting a short message from the mobile communication terminal to a short message service center (SMSC); transmitting a short message service (SMS) submit report message from the SMSC to the mobile communication terminal in response to the short message; receiving, by the mobile communication terminal, the SMS submit report message from the SMSC; transmitting to the mobile communication terminal an SMS status report message including reception time information of the short message when the SMSC transmits the short message to a destination side and receives an SMS deliver report message from the destination side; and extracting the short message reception time information of the SMSC included in the SMS status report message when the mobile communication terminal receives the SMS status report message, and setting a time of the mobile communication terminal on a basis of the reception time information.

In accordance with yet another aspect of the present invention, there is provided a time setting apparatus for use in a mobile communication terminal, that includes a timer for providing a current time; and a controller for transmitting a short message to a short message service center (SMSC), extracting short message reception time information of the SMSC included in a short message service (SMS) status report message when receiving the SMS status report message indicating if a destination side has received the short message, and setting a time of the timer on a basis of the reception time information.

BRIEF DESCRIPTION OF THE DRAWINGS

The above and other features and advantages of the present invention will be more clearly understood from the following detailed description taken in conjunction with the accompanying drawings, in which:

FIG. 3 illustrates a structure of time information contained in a short message service (SMS)-STATUS-REPORT message;

DETAILED DESCRIPTION OF THE PREFERRED EMBODIMENTS

Figure 1:
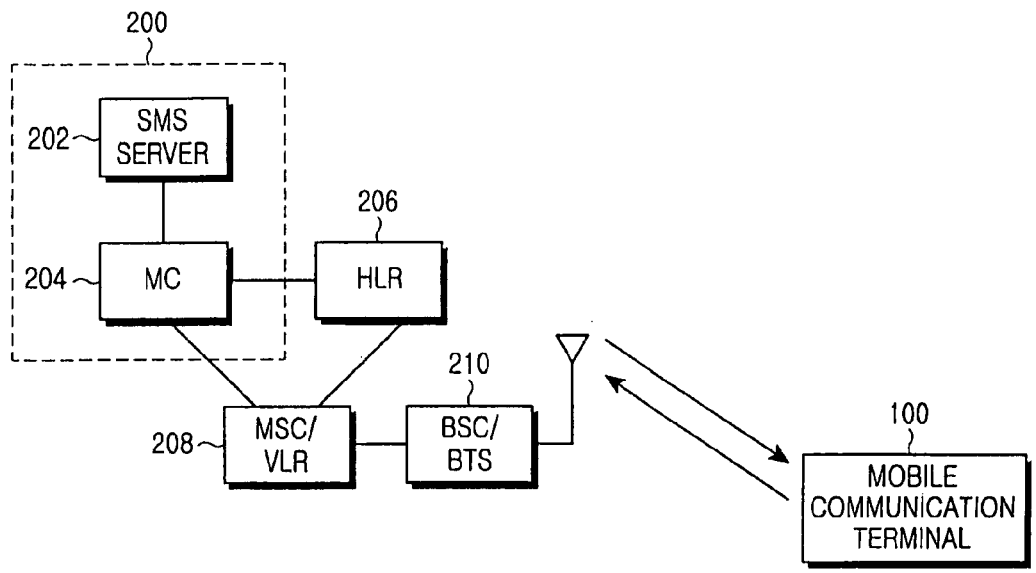
FIG. 1 illustrates a structure of a mobile communication system to which the present invention is applied.

Preferred embodiments of the present invention will now be described in detail with reference to the annexed drawings. Same reference numerals are used to represent same functional parts for the sake of convenience. In the following description, a detailed description of known functions and configurations incorporated herein will be omitted when it may make the subject matter of the present invention rather unclear.

When receiving a short message to be transmitted from a mobile communication terminal to an arbitrary destination side in the present invention, a short message service center (SMSC) transmits reception time information contained in a short message service (SMS)-STATUS-REPORT message to the mobile communication terminal. The mobile communication terminal corrects its time information using the reception time information.

A structure of a mobile communication system to which the present invention is applied will be described with reference to FIG. 1. As illustrated in FIG. 1, the mobile communication system includes a base station controller (BSC)/base station transceiver system (BTS) 210, a mobile switching center (MSC)/visitor location register (VLR) 208, a home location register (HLR) 206, a short message service center (SMSC) 200 and a mobile communication terminal 100.

The BSC/BTS 210 processes a radio signal and a call received from and transmitted to the mobile communication terminal 100. The MSC/VLR 208 performs a switching function for processing an SMS while interacting with each other.

The HLR 206 is a database for providing required subscriber information when a call is processed.

The SMSC 200 is configured with an SMS server 202 and a message center (MC) 204. The SMS server 202 interacting with the MC 204 provides various information services for the SMS to the mobile communication terminal 100 through the MC 204. The MC 204 is responsible for SMS processing and interacting between the SMS server 202 and the MSC/VLR 208. When receiving an SMS-SUBMIT message from an originating mobile communication terminal, the SMSC 200 transmits an SMS-SUBMIT-REPORT message to the originating mobile communication terminal in response to the SMS-SUBMIT message. The SMS-SUBMIT message includes a short message. Then, the SMSC 200 transmits the short message using an SMS-DELIVER message to a destination mobile communication terminal. When receiving an SMS-DELIVER-REPORT message indicating success/fail in receipt of the short message from the destination mobile terminal, the SMSC 200 transmits an SMS-STATUS-REPORT message to the originating mobile communication terminal. The SMS-STATUS-REPORT message may be a message that the SMSC 200 transmits to the originating mobile communication terminal when a 1-bit TransPort-Status-Report-Request (TP-SRR) is set in the SMS-SUBMIT message transmitted from the originating mobile communication terminal. The SMS-STATUS-REPORT message indicates if the transmission-requested short message has been normally transmitted to the destination mobile communication terminal. The SMS-STATUS-REPORT message includes a TP-Service-Center-Time-Stamp (SCTS) indicating reception time information, i.e., information on the time at which the SMSC 200 received the SMS-SUBMIT message from the originating mobile communication terminal 100. The reception time information is constructed as shown in FIG. 3, and includes information about the Year, Month, Day, Hour, Minute, Second, and Time Zone, each of which is assigned 2 digits. FIG. 3 illustrates a structure of time information contained in the SMS-STATUS-REPORT message.

The mobile communication terminal 100 wirelessly communicates with the BSC/BTS 210 and exchanges a short message with the BSC/BTS 210. An SMS layer of the asynchronous mobile communication terminal 100 can be generally divided into an application layer (AL), a transfer layer (TL), a relay layer (RL) and a lower layer (LL).

The AL is an application for providing a user with the SMS. The TL transfers various SMS messages such as an SMS-DELIVER message, an SMS-SUBMIT-REPORT message and an SMS-STATUS-REPORT message relayed by the RL to the user through the AL. The TL transfers a short message to the RL through the AL in response to a user request and transfers an SMS-DELIVER-REPORT message to the RL in response to the received short message. The RL relays SMS-related messages provided by the TL through the LL or relays, to the TL, SMS-related messages received through the LL. That is, when the TL of the mobile communication terminal 100 provides the RL with the short message received from the AL, the RL wirelessly relays the short message to the SMSC 200. The RL relays, to the TL, the SMS-SUBMIT-REPORT message and the SMS-STATUS-REPORT message received from the SMSC 200. When receiving the SMS-DELIVER message from the SMSC 200, the RL of the mobile communication terminal 100 relays the SMS-DELIVER message to the TL and the TL transfers the SMS-DELIVER message to the user through the AL. Further, the TL of the mobile communication terminal transfers, to the SMSC 200, the SMS-DELIVER-REPORT message indicating if the SMS-DELIVER message has been successfully received through the RL.

As described above, the mobile communication terminal 100 provides the SMS in an interaction process between the layers.

Figure 2:
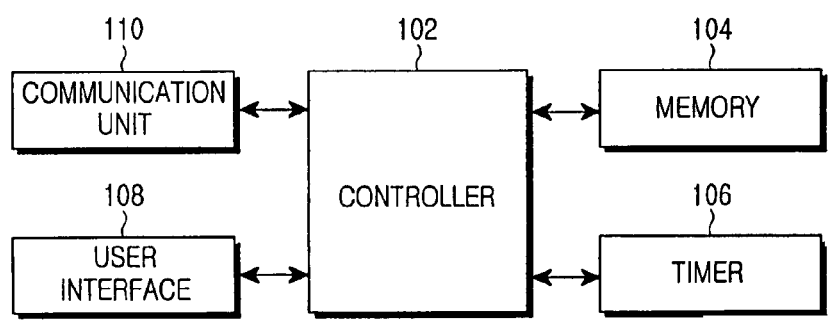
FIG. 2 illustrates a structure of a mobile communication terminal in accordance with the present invention.

A structure of the mobile communication terminal 100 is illustrated in FIG. 2. Referring to FIG. 2, the mobile communication terminal 100 includes a controller 102, a memory 104, a timer 106, a user interface 108, and a communication unit 110.

The memory 104 stores programs for processing and control functions of the controller 102, reference data, various kinds of updatable data for storage, and so on. The memory 104 is provided as a working memory of the controller 102. Further, the memory 104 stores a time at which a short message is transmitted under control of the controller 102 and a time required to transmit the short message to the SMSC 200 that is computed by the controller 102.

The timer 106 counts the time and adjusts the time during counting under the control of the controller 102. The user interface 108 provides an interface between the user and the controller 102.

The communication unit 110 is responsible for a mobile communication function of the mobile communication terminal 100. Under the control of the controller 102, the communication unit 110 transmits an SMS-SUBMIT message including a short message and also outputs a received SMS-SUBMIT-REPORT message mapped to the transmitted SMS-SUBMIT message and an SMS-STATUS-REPORT message to the controller 102.

The controller 102 controls the overall operation of the mobile communication terminal and sets an internal time of the mobile communication terminal 100 on the basis of a time at which a short message is transmitted, a time required to transmit the short message to the SMSC 200 and reception time information detected from the SMS-STATUS-REPORT message received from the SMSC 200.

Figure 5:
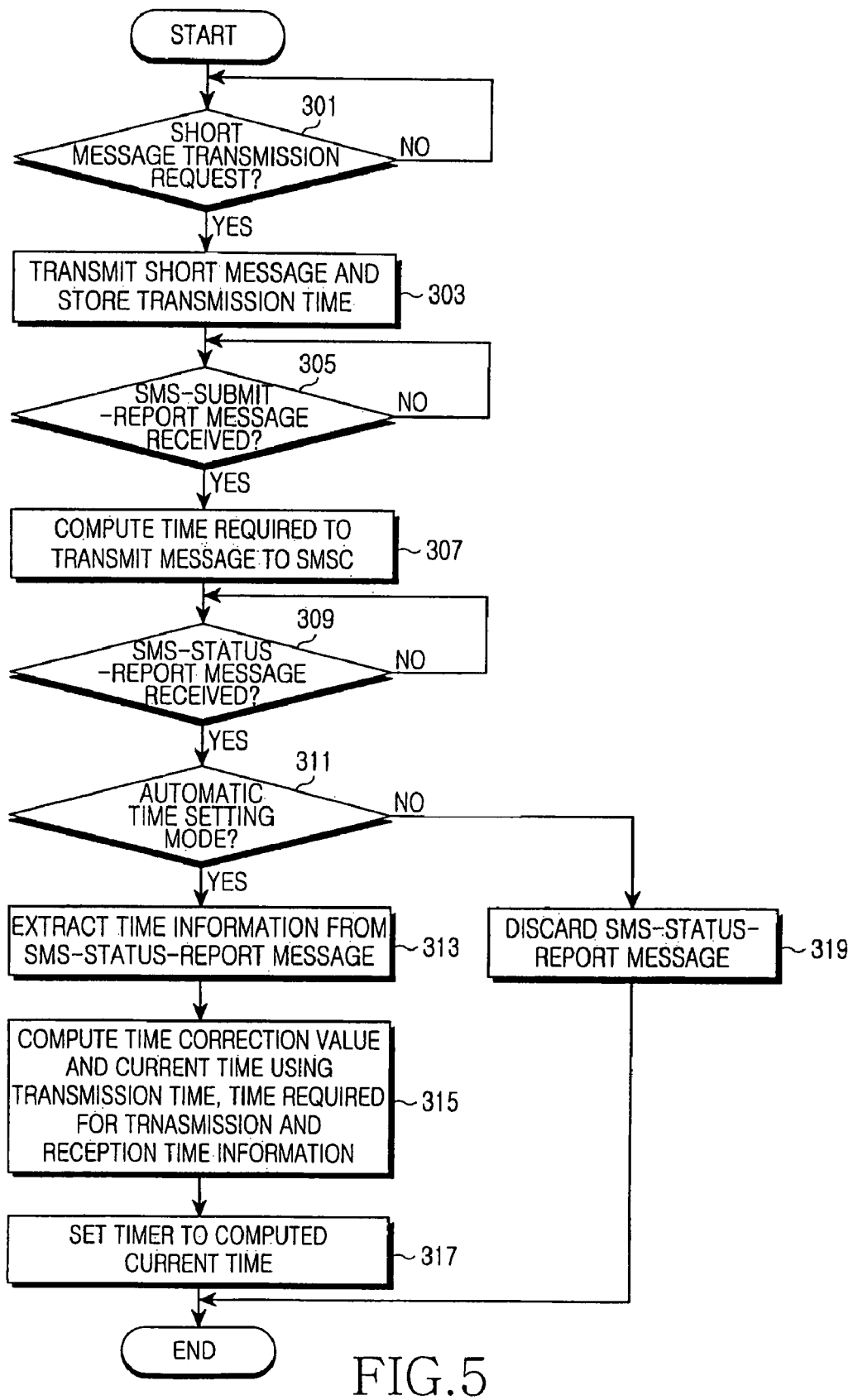
FIG. 5 illustrates an operation process of the mobile communication terminal in accordance with the present invention.

A process for setting an internal time in the controller 102 of the mobile communication terminal 100 will be described with reference to FIG. 5. Referring to FIG. 5, when the user requests a short message transmission in step 301, the controller 102 proceeds to step 303. In step 303, the controller 102 includes a short message in an SMS-SUBMIT message, sets and transmits a TP-SRR in the SMS-SUBMIT message, and stores a transmission time in the memory 104. When receiving an SMS-SUBMIT-REPORT message through the communication unit 110 in step 305, the controller 102 determines a reception time and computes a time required to transmit the short message to the SMSC 200 in step 307. Assuming that the transmission time is tm, the reception time is t1, and the time required for transmission is t2, the time t2 required for transmission is computed as shown in Equation (1).

$$t2=(t1-tm)/2 \qquad (1)$$

The controller 102 stores in the memory 104 the computed time required for transmission. When receiving an SMS-STATUS-REPORT message from the SMSC 200 through the communication unit 110 in step 309, the controller 102 proceeds to step 311. In step 311, the controller 102 determines if automatic time correction mode is set. If the automatic time correction mode is set, the controller 102 proceeds to step 313. However, if the automatic time correction mode is not set, the controller 102 in step 319 discards the SMS-STATUS-REPORT message and ends the operation process.

The controller 102 extracts reception time information contained in the received SMS-STATUS-REPORT message in step 313 and then proceeds to step 315. The reception time information indicates information about a time at which the SMSC 200 has received the SMS-SUBMIT message from the mobile communication terminal 100 in step 303. In step 315, the controller 102 computes a time correction value using the transmission time, the time required for transmission and the reception time information. Assuming that the transmission time is tm, the time required for transmission is t2, the reception time information is tsc and the time correction value is td, the time correction value td is computed as shown in Equation (2).

$$td=tsc-tm-(t1-tm)/2=tsc-tm-t2 \qquad (2)$$

If the time set in the mobile communication terminal 100 matches an actual time, the correction value td becomes 0. When the time set in the mobile communication terminal 100 is earlier than the actual time, the correction value td becomes a minus (−) value. When the time set in the mobile communication terminal 100 is later than the actual time, the correction value td becomes a positive (+) value. The controller 102 computes the current time using the correction value and corrects the time of the timer 106 of the mobile communication terminal 100 in step 317.

Figure 4:
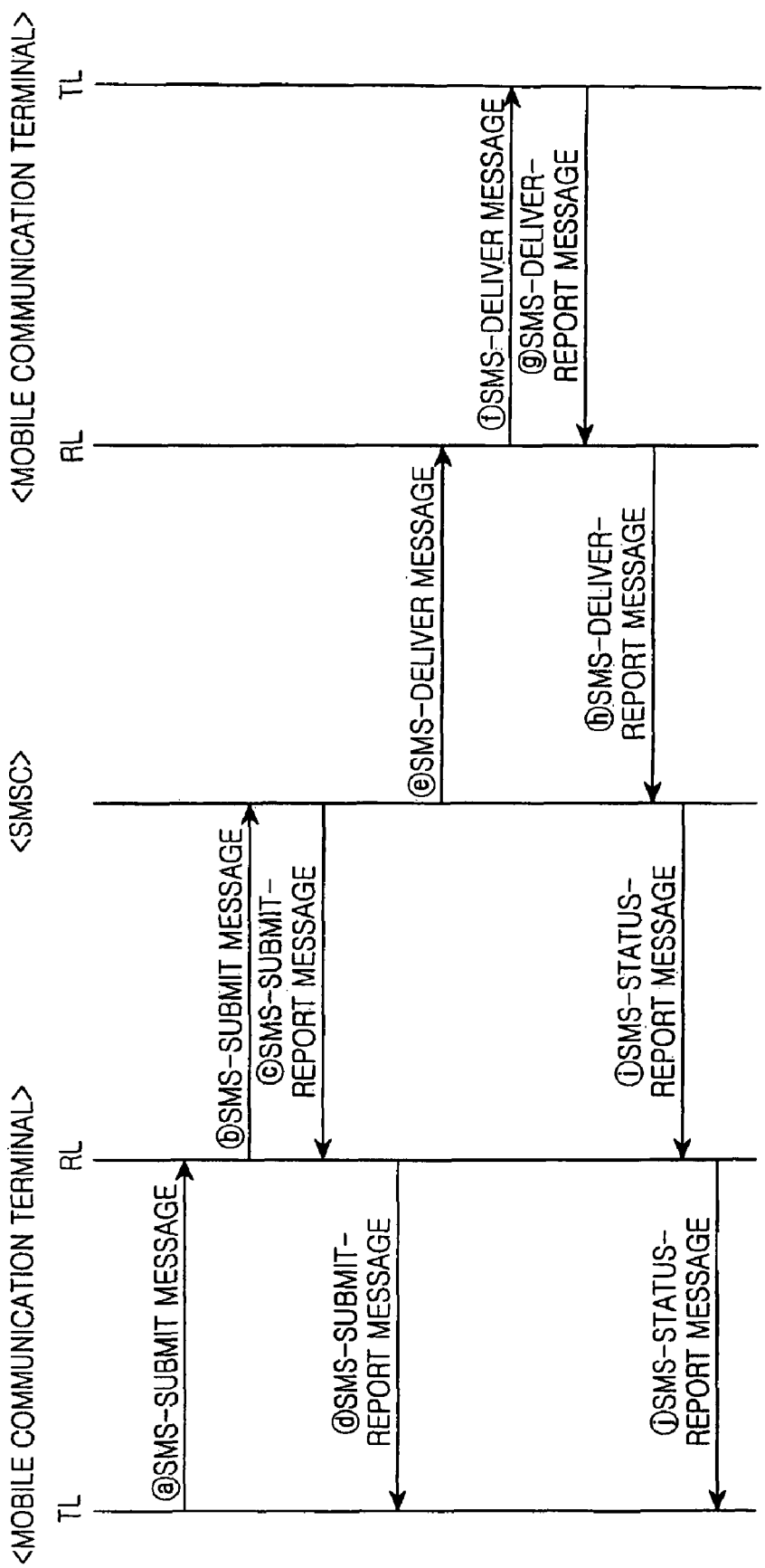
FIG. 4 illustrates a message transmission process of the mobile communication system in accordance with the present invention.

A short message transmission process when a short message is transmitted in a mobile communication system and a time setting process in the mobile communication terminal 100 will be described with reference to FIGS. 1 and 4. FIG. 4 illustrates the message transmission process of the mobile communication system in accordance with the present invention. Referring to FIGS. 1 and 4, the TL of the mobile communication terminal 100 provides the RL with an SMS-SUBMIT message including a short message received from the AL in step "a". The RL relays the SMS-SUBMIT message to the SMSC 200 by wireless in step "b". At this time, the mobile communication terminal 100 stores a short message transmission time. When receiving the SMS-SUBMIT message from the mobile communication terminal 100, the SMSC 200 determines if the received short message is normal and transmits an SMS-SUBMIT-REPORT message (Ack/Error) to the mobile communication terminal 100 in step "c". The RL of the mobile communication terminal 100 relays the SMS-SUBMIT-REPORT message to the TL in step "d". The mobile communication terminal 100 computes a time required to transmit the short message to the SMSC 200 using the transmission time stored in step "b" and a reception time of the SMS-SUBMIT-REPORT message as shown in Equation (1).

In step "e", the SMSC 200 transmits an SMS-DELIVER message to a destination mobile communication terminal.

The RL of the destination mobile communication terminal relays the SMS-DELIVER message from the SMSC 200 to the TL in step "f". The TL transfers the short message included in the SMS-DELIVER message to the user through the AL. The TL of the destination mobile communication terminal provides the SMSC 200 with an SMS-DELIVER-REPORT message (Ack/Error) indicating whether the short message has been normally received through the AL in steps "g" and "h".

When receiving the SMS-DELIVER-REPORT message from the destination mobile communication terminal, the SMSC 200 provides the mobile communication terminal 100 with an SMS-STATUS-REPORT message containing information about a time at which the SMS-SUBMIT message in step "b" has been received in step "i". The RL of the mobile communication terminal 100 relays the received SMS-STATUS-REPORT message to the TL in step "j". When receiving the SMS-STATUS-REPORT message, the mobile communication terminal 100 detects the reception time information from the SMS-STATUS-REPORT message, and computes a time correction value using the detected reception time information, the transmission time stored in step "b", and the time required for transmission computed in step "d" as shown in Equation (2), and corrects the current time using the computed time correction value.

As described above, according to the present invention, it is expected that upon transmission of a short message, the mobile communication terminal 100 can correct and set an internal time using the SMS-STATUS-REPORT message indicating whether the destination mobile communication terminal has received the short message.

In accordance with another embodiment of the present invention, the mobile communication terminal 100 can be configured to provide time difference information when a time difference is present between a region in which the user is currently located and a region in which a home public land mobile network (HPLMN) is located at the time of time correction. An operation process of the mobile communication terminal will be described with reference to FIG. 6.

Figure 6:
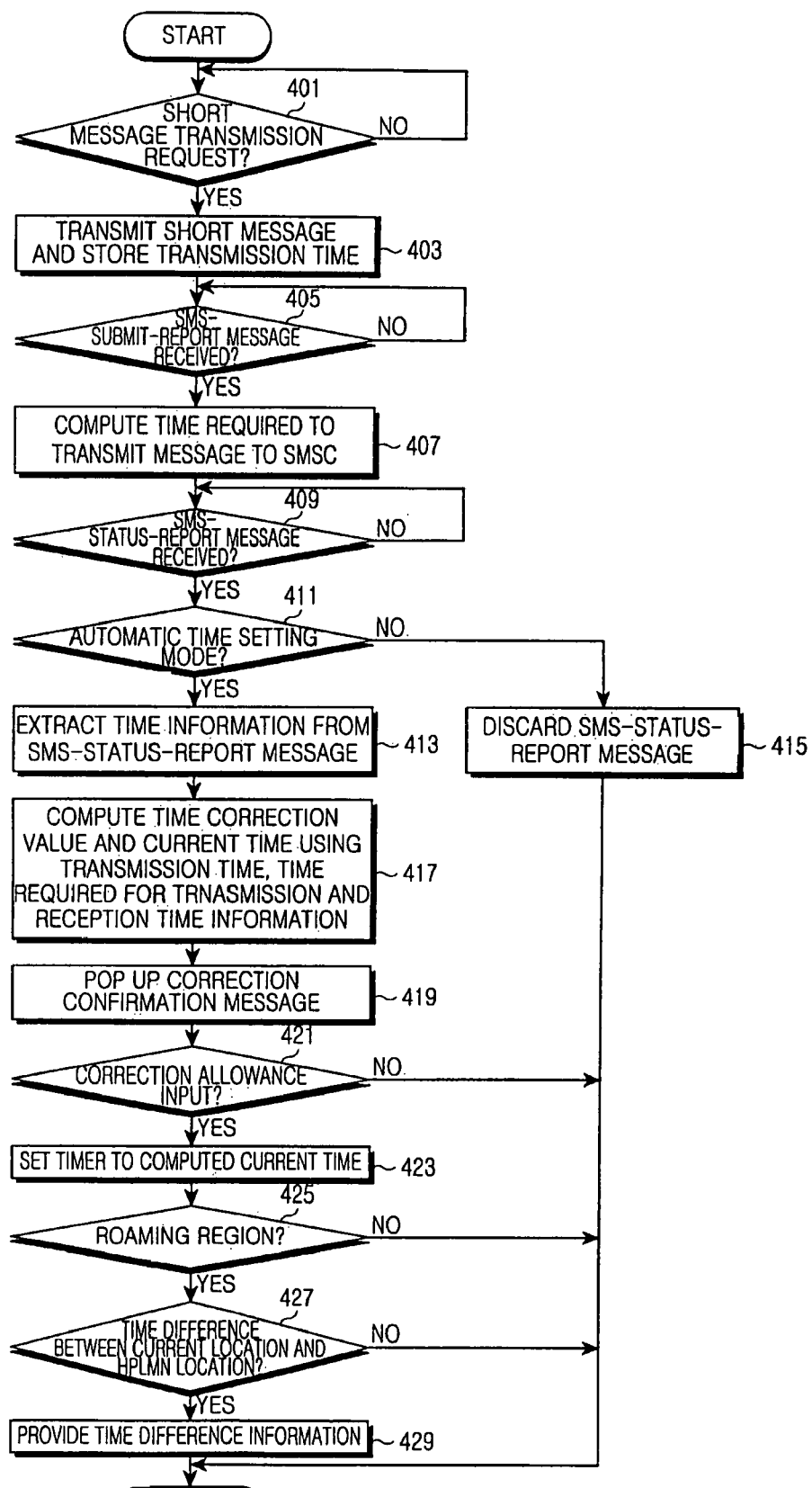
FIG. 6 illustrates an operation process of the mobile communication terminal in accordance with the present invention.

Referring to FIG. 6, when the user requests a short message transmission in step 401, the mobile communication terminal 100 proceeds to step 403. In step 403, the mobile communication terminal includes a short message in an SMS-SUBMIT message, sets and transmits a TP-SRR in the SMS-SUBMIT message, and stores a transmission time in the memory 104. When receiving an SMS-SUBMIT-REPORT message in step 405, the mobile communication terminal 100 determines a reception time and computes in step 407 the time required to transmit the short message to the SMSC 200 using Equation (1). Then, the mobile communication terminal 100 proceeds to step 409. When receiving an SMS-STATUS-REPORT message in step 409, the mobile communication terminal proceeds to step 411. In step 411, the mobile communication terminal 100 determines if the automatic time correction mode is set. If the automatic time correction mode is set, the mobile communication terminal 100 proceeds to step 413. However, if the automatic time correction mode is not set, the mobile communication terminal 100 in step 415 discards the SMS-STATUS-REPORT message and ends the operation process.

The mobile communication terminal 100 extracts reception time information contained in the received SMS-STATUS-REPORT message in step 413 and then proceeds to step 417. In step 417, the mobile communication terminal 100 computes a time correction value using the transmission time, the time required for transmission and the reception time information as shown in Equation (2). The mobile communication terminal 100 computes the current time using the correction value and then proceeds to step 419. That is, the mobile communication terminal 100 adds the correction value to the current time or subtracts the correction value from the current time. In step 419, the mobile communication terminal pops up or displays a correction confirmation message. In step 421, when a correction allowance input from the user is present, the mobile communication terminal 100 proceeds to step 423. In step 423, the mobile communication terminal 100 sets the timer to the current time computed in step 417. Then, the mobile communication terminal 100 proceeds to step 425. In step 425, the mobile communication terminal 100 determines if it is currently located in a roaming region. If the mobile communication terminal 100 is currently located in the roaming region, it proceeds to step 427. At this time, information about the roaming region can be acquired from the mobile communication system. In step 427, the controller 102 determines if a time difference is present due to a difference between the current location and the location of the HPLMN of the terminal. If the time difference is present, the mobile communication terminal 100 proceeds to step 429. Information about the HPLMN is pre-stored in the mobile communication terminal 100. In step 429, the mobile communication terminal 100 provides time difference information and ends the operation process.

Although the exemplary embodiments of the present invention have been disclosed for illustrative purposes, those skilled in the art will appreciate that various modifications, additions, and substitutions are possible, without departing from the scope of the present invention. For example, a time required to transmit a short message can be computed by an equation different from Equation (1) and a time correction value can be computed by an equation different from Equation (2). When receiving the short message from a mobile communication terminal in the present invention, an SMSC transmits an SMS-STATUS-REPORT message containing reception time information to the mobile communication terminal. Using the reception time information, the mobile communication terminal corrects time information to be provided. Therefore, the present invention is not limited to the above-described embodiments, but is defined by the following claims, along with their full scope of equivalents.

In the prior art, users manually perform a time setting process in an asynchronous mobile communication network in which current time-related information is not provided. However, the present invention can automatically perform a time setting process only using current service information without installing additional equipment in the asynchronous mobile communication network. Moreover, the present invention can acquire synchronization in any country in which a communication terminal of a user is located.

What is claimed is:

1. A time setting method for use in a mobile communication terminal, the method comprising the steps of:
    transmitting, by the mobile communication terminal, a short message for a destination side to a short message service center (SMSC);
    receiving, from the SMSC, a short message service (SMS) status report message indicating if the destination side has received the short message;
    extracting short message reception time information of the SMSC included in the SMS a status report message, the short message reception time information indicating a time when the SMSC received the short message from the mobile communication terminal; and
    setting a time of the mobile communication terminal based on the extracted short message reception time information.

2. The time setting method of claim 1, wherein the step of transmitting the short message to the SMSC comprises:
    including the short message in an SMS submit message;
    setting and transmitting a TransPort-Status Report Request (TP-SRR) in the SMS submit message; and
    storing a transmission time of the short message.

3. The time setting method of claim 2, wherein the step of extracting the short message reception time information comprises:
    computing a time required to transmit the short message to the SMSC using the transmission time and a reception time of an SMS submit report message from the SMSC; and
    detecting the reception time information included in the SMS status report message.

4. The time setting method of claim 3, wherein the step of setting the time of the mobile communication terminal comprises:
    computing a time correction value using the transmission time, the time required to transmit the short message to the SMSC, and the reception time information; and
    computing and setting a current time using the time correction value.

5. The time setting method of claim 4, wherein the time required to transmit the short message to the SMSC is computed by $$t2=(t1-tm)/2,$$

where tm is the transmission time, t1 is the reception time and t2 is the time required to transmit the short message to the SMSC.

6. The time setting method of claim 5, wherein the time correction value is computed by $$td=tsc-tm-t2,$$

where td is the time correction value, tm is the transmission time, t2 is the time required to transmit the short message to the SMSC and tsc is the reception time information.

7. The time setting method of claim 6, further comprising:
displaying a time correction confirmation message when computing and setting the current time using the time correction value; and
applying the computed current time when prompted by a user.

8. The time setting method of claim 7, further comprising:
providing time difference information when the mobile communication terminal is located in a roaming region after the computed current time is set and a time difference is present due to a difference between current location of the mobile communication terminal and location of a home public land mobile network (HPLMN).

9. A time setting method for use in a mobile communication terminal of a mobile communication system, the method comprising the steps of:
transmitting a short message from the mobile communication terminal to a short message service center (SMSC);
transmitting a short message service (SMS) submit report message from the SMSC to the mobile communication terminal in response to the short message;
receiving, by the mobile communication terminal, the SMS submit report message from the SMSC;
transmitting to the mobile communication terminal an SMS status report message that includes reception time information of the short message when the SMSC transmits the short message to a destination side and receives an SMS deliver report message from the destination side; and
extracting the short message reception time information of the SMSC included in the SMS status report message when the mobile communication terminal receives the SMS status report message, and setting a time of the mobile communication terminal based on the short message reception time information,
wherein the short message reception time information of the SMSC indicates a time at which the SMSC received the short message.

10. The time setting method of claim 9, wherein the step of transmitting the short message from the mobile communication terminal to the SMSC comprises:
including the short message in an SMS submit message;
setting and transmitting a TransPort-Status Report Request (TP-SRR) in the SMS submit message; and
storing a transmission time of the short message.

11. The time setting method of claim 10, wherein the step of receiving, by the mobile communication terminal, the SMS submit report message from the SMSC comprises:
receiving the SMS submit report message from the SMSC; and
computing a time required to transmit the short message to the SMSC using the transmission time and a reception time of the SMS submit report message.

12. The time setting method of claim 11, wherein the step of setting the time of the mobile communication terminal comprises:
detecting the reception time information included in the SMS status report message when receiving the SMS status report message;
computing a time correction value using the transmission time, the time required to transmit the short message to the SMSC and the reception time information; and
computing and setting a current time using the time correction value.

13. A time setting apparatus for use in a mobile communication terminal, comprising:
a timer for providing a current time; and
a controller configured to transmit a short message for a destination side to a short message service center (SMSC), receive, from the SMSC, a short message service (SMS) status report message indicating if the destination side has received the short message, extract short message reception time information of the SMSC included in the SMS status report message, the short message reception time information indicating a time when the SMSC received the short message from the mobile communication terminal, and set a time of the timer based on the extracted short message reception time information.

14. The time setting apparatus of claim 13, wherein the controller includes the short message in an SMS submit message, sets and transmits a TransPort-Status Report Request (TP-SRR) in the SMS submit message, stores a transmission time according to transmission, computes a time required to transmit the short message to the SMSC using the transmission time and a reception time of an SMS submit report message from the SMSC, detects the reception time information included in the SMS status report message, computes a time correction value using the transmission time, the time required to transmit the short message to the SMSC and the reception time information, and computes and sets a current time using the time correction value.

* * * * *